United States Patent [19]
Probst

[11] Patent Number: 4,830,383
[45] Date of Patent: May 16, 1989

[54] ENGINE SEAL USING FLOWABLE SEALANT

[75] Inventor: Harry C. Probst, Oshkosh, Wis.

[73] Assignee: Brunswick Corporation, Skokie, Ill.

[21] Appl. No.: 212,880

[22] Filed: Jun. 29, 1988

[51] Int. Cl.$^4$ ............................................. F16J 15/14
[52] U.S. Cl. .................................. 277/12; 277/235 B
[58] Field of Search ...................... 277/1, 12, 32, 178, 277/182, 183, 186, 235 B; 440/53

[56] References Cited

U.S. PATENT DOCUMENTS

| | | | |
|---|---|---|---|
| 2,140,672 | 12/1938 | Gray et al. | 277/1 X |
| 3,116,198 | 12/1963 | Grawley et al. | 277/1 X |
| 3,261,262 | 7/1966 | Hilfing et al. | 277/1 X |
| 3,843,764 | 10/1974 | Grawley et al. | 277/1 X |
| 4,402,518 | 9/1983 | Locacius | 277/235 B X |
| 4,494,491 | 1/1985 | Takada et al. | 277/235 B X |
| 4,543,068 | 9/1985 | Brandt et al. | 440/53 |

OTHER PUBLICATIONS

Chevrolet Citation Owners Workshop Manual, Years of 1980–1985, Front Cover, Title Page and pp. 49, 52 and 53. (Haynes Publication, Inc.: Newbury Park, CA.).

*Primary Examiner*—Robert S. Ward
*Attorney, Agent, or Firm*—Andrus, Sceales, Starke & Sawall

[57] ABSTRACT

An engine seal for preventing fluid leaks at the seam formed by the joining of two engine components includes a flowable sealant disposed along a seal bearing surface of one of the engine components and a seal engaging surface disposed along the second engine component so that upon joining the engine components, the flowable seal will be compressed between the seal bearing surface and the seal engaging surface.

6 Claims, 1 Drawing Sheet

ENGINE SEAL USING FLOWABLE SEALANT

BACKGROUND OF THE INVENTION

This invention relates to engine seals and more particularly to the sealing of the seam formed by the joining of two components of a marine engine.

In the past, the seam between various marine engine components such as the water jacket cover and the cylinder block has been sealed by the use of a gasket.

Typical gaskets, many with asbestos fillers, were used and due to heating and cooling of the engine components as well as compression of the gaskets, the seals deteriorated and the engine began to leak water, exhaust gas, gasoline and/or air which hampered the proper operation of the engine.

It is an object of the present invention to eliminate the gaskets presently used at these seams between engine components and to provide proper and complete sealing in an inexpensive manner.

It is also an object of this invention to provide an easy and inexpensive method of resealing the engine components if the components are disassembled for repair or maintenance.

SUMMARY OF THE INVENTION

An engine seal for preventing fluid leaks at the seams formed by the joining of two engine components includes a first engine component having a seal bearing surface disposed adjacent an abutment surface.

A flowable sealant is disposed along the seal bearing surface and a second engine component is provided with a seal engaging surface which compresses the flowable sealant when the engine components are joined.

A fastening means is provided for releasably maintaining the engine components in engagement.

The present invention thus provides a positive long lasting seal that requires only a refill of the flowable sealant to return the seal to its initial efficiency once the parts are disassembled and then reassembled.

BRIEF DESCRIPTION OF THE DRAWINGS

The drawings illustrate the best mode presently contemplated of carrying out the invention.

In the drawings.

DESCRIPTION OF THE PREFERRED EMBODIMENT

Figure 1:
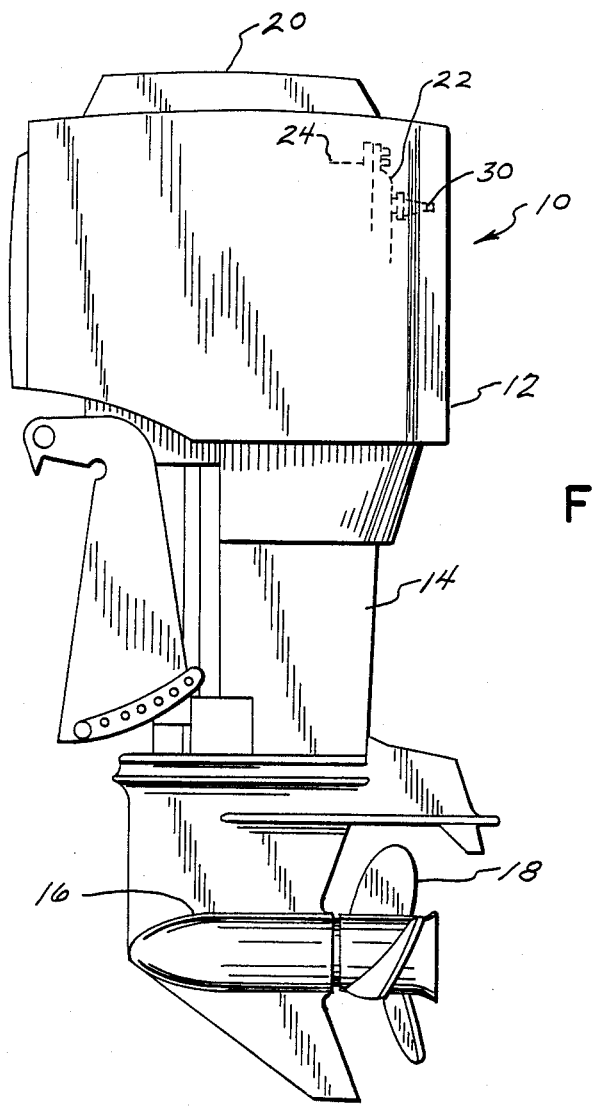
FIG. 1 is a side view of a marine engine having engine components joined to form a seam.

FIG. 1 illustrates a typical marine out-board engine 10 having a power head 12, a drive shaft housing 14, and a lower unit 16 including a propeller 18.

Figure 2:
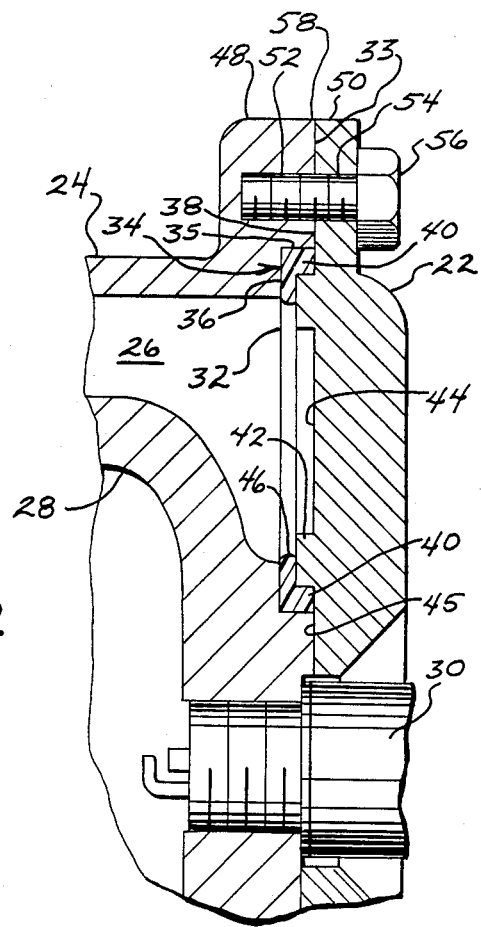
FIG. 2 is an enlarged cross sectional view of the engine components shown in FIG. 1.

Various engine components are housed within the cowling 20 of power head 12 and FIGS. 1 and 2 illustrate the seam formed by the water jacket cover 22 and the cylinder block 24. The seal provided by the present invention can be used to seal other engine components such as a gasoline or crank case seal and exhaust seals. However, for purposes of illustration, FIGS. 1 and 2 have been limited to the seal between the water jacket cover 22 and the cylinder block 24.

As seen in FIG. 2, cylinder block 24 includes a passageway 26 that it utilized to circulate coolant around a cylinder 28 which has a spark plug 30 extending into it.

The opening 32 in passageway 26 is closed by water jacket cover 22 which forms a seam 33 between the two engine components 22 and 24.

In order to seal seam 32, cylinder block 24 is provided with a seal bearing surface 34 disposed adjacent abutment surface 35 and which is comprised of a rim 36 disposed along passageway 26 and a raised edge 38 disposed outwardly from passageway 26.

A flowable sealant 40 such as a high temperature silicone or a R.T.V. sealant is disposed along seal bearing surface 34. The type of flowable sealant utilized of course depends on the fluid that is being contained. A standard silicone rubber sealant for example would be utilized to seal cooling system components while a sealant formulated to be impervious to fuel would have to be utilized to seal gasoline or crank case components.

Water jacket cover 22 is provided with a ridge 42 extending from its lower surface 44 and disposed adjacent its abutment surface 45. Ridge 42 is disposed so as to be adjacent rim 36 when components 22 and 24 are joined so that ridge 42 contacts and compresses flowable sealant 40. The compression of sealant 40 will cause the sealant to be forced into all the cracks and crevices and any excess sealant 46 will flow into passageway 26.

Each of engine components 22 and 24 are provided with flanges 48 and 50 which define abutment surfaces 35 and 45 and which have threaded holes 52 and 54 which accept a bolt 56 or other threaded fastener for releasably maintaining the two components in engagement. Flanges 48 and 50 also serve to provide an additional sealing area 58 along which a gasket could be placed if components 22 and 24 were separated and the mechanic found himself without a suitable flowable sealant at the time it was desired to rejoin the components. However, this invention is directed to the replacement of such gaskets and therefore, should the components be disassembled, it would obviously be desirable to replace the flowable sealant upon rejoining the components.

It is recognized that various alternatives and modifications are possible in the scope of the appended claims.

I claim:

1. An engine seal for preventing fluid leaks at the seam formed by the joining of two engine components comprising:

a first engine component having a seal bearing surface substantially adjacent an abutment surface, a flowable sealant disposed along said seal bearing surface, a second engine component having a seal engaging surface substantially adjacent an abutment surface where upon joining of said first and second engine components, said seal engaging surface will compress said flowable sealant between said seal bearing surface and said seal engaging surface and said abutment surfaces will engage, and fastening means for releasably maintaining said abutment surfaces in engagement.

2. The seal defined in claim 1 wherein said first engine component includes a fluid flow passageway and said seal bearing surface comprising a rim disposed along said passageway with said rim having a raised edge disposed outwardly from said passageway.

3. The seal defined in claim 1 wherein said seal engaging surface comprises a ridge extending outwardly from a surface of said second engine component.

4. The seal defined in claim 2 wherein said seal engaging surface comprises a ridge disposed along a surface of said second engine component so as to be adjacent said rim when said components are joined.

5. The seal defined in claim 1 wherein said abutment surfaces are substantially flat in order to accommodate a gasket between them.

6. An engine seal for preventing fluid leaks at the seam formed by the joining of two engine components comprising:
   a first engine component having a fluid flow passageway and an opening providing access to said passageway,
   a second engine component disposed over said opening and abutting said first component,
   said first engine component having a rim disposed along said passageway with said rim having a raised edge disposed outwardly from said passageway,
   said second engine component having a ridge disposed along its surface so as to be adjacent said rim when said components are abutting,
   a flowable sealant placed along said rim so that upon engagement of said first and second components said ridge engages and compresses said sealant forming a seal between said first and second components and allowing excess sealant to flow into said passageway, and
   fastening means for releasably maintaining said first and second components in engagement.

* * * * *